United States Patent [19]

Loup

[11] 4,375,226
[45] Mar. 1, 1983

[54] VALVE BODY FOR SOLENOID OPERATED DIRECTIONAL VALVE

[75] Inventor: Ronald L. Loup, Clarkston, Mich.

[73] Assignee: Double A Products Company, Manchester, Mich.

[21] Appl. No.: 144,546

[22] Filed: Apr. 28, 1980

[51] Int. Cl.³ .................... F16K 11/07; F16K 27/04
[52] U.S. Cl. ........................ 137/625.65; 251/366; 137/625.69
[58] Field of Search ............... 137/625.69, 625.64, 137/625.65; 251/366, 367

[56] References Cited

U.S. PATENT DOCUMENTS

| | | | |
|---|---|---|---|
| 2,638,122 | 5/1953 | Ludwig | 137/625.69 X |
| 3,140,728 | 7/1964 | Webb | 137/625.69 |
| 3,354,912 | 11/1967 | Gordon et al. | 137/625.69 |

FOREIGN PATENT DOCUMENTS

| | | | |
|---|---|---|---|
| 1550633 | 9/1969 | Fed. Rep. of Germany | 137/625.69 |
| 2515035 | 10/1975 | Fed. Rep. of Germany | 137/625.69 |

*Primary Examiner*—Arnold Rosenthal
*Attorney, Agent, or Firm*—Olsen & Stephenson

[57] ABSTRACT

A solenoid operated directional valve with a valve body provided with a bore that has axially spaced annuli, a mounted surface with ports arranged in a pattern of standard configuration, and ducts extending from the ports to the annuli to provide passageways for flow of fluid, and a spool mounted for movement axially in said bore for controlling flow of fluid through said passageways, the passageways being formed in a unique manner in said body so that a minimum pressure drop occurs in the fluid flowing through each passageway.

5 Claims, 7 Drawing Figures

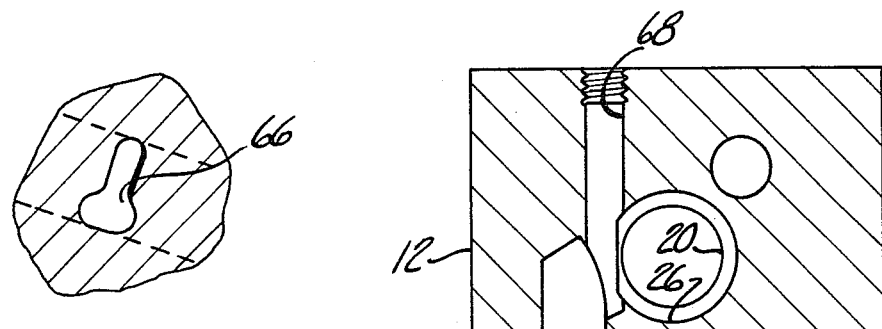
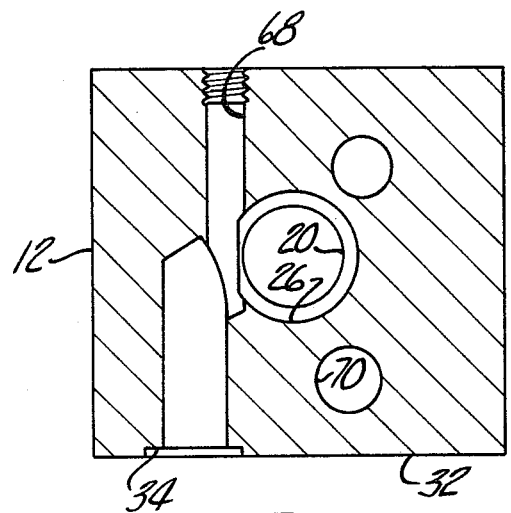
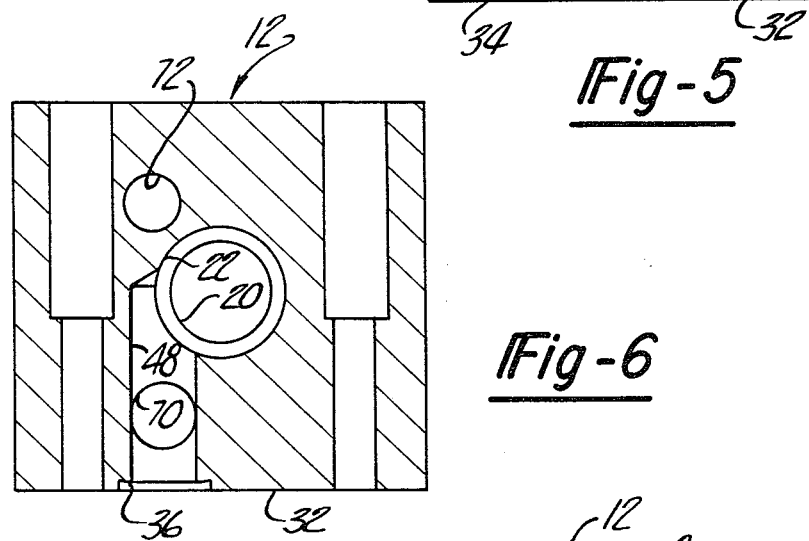
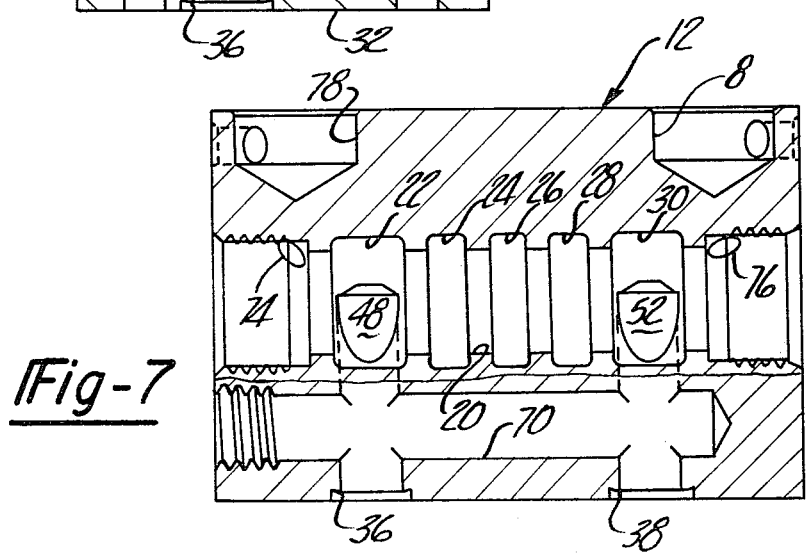

VALVE BODY FOR SOLENOID OPERATED DIRECTIONAL VALVE

TECHNICAL FIELD

The present invention relates to a solenoid operated directional valve which, in response to actuation of a solenoid, has a spool for movement to a desired position for controlling the direction of flow of hydraulic fluid through the valve, and which has a valve body with a mounting surface on which pressure, line and tank ports are arranged in a standard pattern and size.

BACKGROUND ART

It is conventional practice to use a solenoid operated directional valve which has a valve body with a mounting surface that embodies a standard hole or port pattern. The port pattern is triangular in shape and contains a pressure "P-port" at the apex of the triangle, a pair of tank "T-ports" at the base corners of the triangle, and a pair of line "A- and B-ports" in the opposite sides, respectively, of the triangle. By virtue of the standard port pattern the directional valve can be used readily in the hydraulic industry with hydraulic valve modules, various plates and manifolds and the like, all of which embody similar port patterns, to form compact and uniform sandwich and stack arrangements.

In solenoid operated directional valves of the foregoing character, the valve body frequently is formed by a casting operation in which cores are used to define the conventional annuli that are located in the bore that accommodates the spool and to define the ducts that lead to the annuli, and thereafter drilling operations are performed on the valve body to finish the bore and to connect the ports in the mounting surface to the appropriate ducts or annuli in the bore. It is also known to form the valve body from bar stock, or the like, and to perform the necessary drilling operations to form the bore for the spool with the appropriate annuli, and to connect the ports in the mounting surface to the appropriate annuli in the bore.

The valve bodies in these directional valves, whether formed from castings or bar stock, are known to create significant pressure drops in the fluids that flow through the various passageways. This characteristic of the valves creates problems which heretofore have been undesirable but which have been looked upon by the industry as inherent in this type of valve. Among the problems created are the necessity to supply the fluid to the valve at a higher pressure than is required at the work stations so as to accommodate the pressure drop and also to supply the fluid to the line ports at a pressure sufficiently high to meet the requirements at the associated work stations. The requirement for supplying fluid at the extra-high pressure to the P-port to accomodate the pressure drop creates various undesirable conditions, including the requirement that larger solenoids be used to move the spool than would otherwise be necessary, which in turn increases costs, may cause overheating problems, and the like.

A significant reason for the undesirable pressure drops that exist in the prior directional valves has been the existence of the standard port arrangement in the mounting surface of the valve body. Because of the requirement that the ports be located in a standard arrangement and size, the manufacturers have been severely limited in the design and location of the various passageways that must be fitted into the valve body.

The valve bodies that are formed by casting operation can be cast while using special cores to define the core for the spool and the passageways which permit flow of fluid through the valve. However, the complexity of the casting prohibits passageways of ideal shape to be formed, and numerous other factors contribute to undesirable products or excessive costs, such as (1) cleaning requirements associated with castings, (2) porosity of the castings, (3) uncontrolled core shifting during casting operations, (4) finishing machining operations that must be made, (5) varying casting conditions caused by different hardnesses of the metal, and the like.

Prior valve bodies that have been machined from bar stock or the like have been free of some of the defects of cast valve bodies, but they have left much to be desired, primarily because the machining operations involved have caused some of the passageways in the valve body to be of a size and shape that inherently create undesirable fluid-flow conditions. This problem is particularly acute, because the annuli in the bore for the spool have widths substantially less than the diameter of the ports in the mounting surface, and therefore, when drilling from the ports to the annuli it is a common practice to use small diameter drill bits to avoid cutting the lands between the annuli. Thus, the end products, after the drilling operations have been completed include passageways of varying effective cross-sectional areas and sharp directional changes which produce undesirable pressure changes and resulting pressure drops.

DISCLOSURE OF THE INVENTION

The present invention provides an improved solenoid operated valve with a valve body that has overcome the inadequacies of the prior art and has provided improved valve operation with a significant reduction in the pressure drop through the passageways, essentially in an amount of about one half that found in prior art devices.

One feature of the present invention that contributes to this end is the configuration and arrangement of the passageways in the valve body that assures that the flow of the fluid will be as near as possible at a constant velocity. This characteristic is found to have a significant effect on minimizing the pressure drop. A related feature that contributes toward reaching this result is the arrangement of the ducts leading to the annuli in the bore for the spool, whereby the flow of fluid entering the bore is essentially tangential so as to minimize the change of direction and creation of unnecessary turbulent flow. Still another related feature is the specific shape of the ducts leading from certain of the ports in the mounting surface to the annuli in the spool-bore. The improved shape of the ducts has been achieved by drilling operations wherein two-step drill bits of a non-conventional shape have been employed. This shaping of the ducts at the point of entry into the annuli has assured that the effective cross-sectional area of each of the flow passageways through the valve body will approach as near as is practical a constant, and thereby will achieve the desired uniform velocity of flow throughout the length of that passageway.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 4 is a fragmentary section taken on the line 4—4 of FIG. 3;

FIG. 5 is a sectional view taken on the line 5—5 of FIG. 2 showing the duct from the pressure port intersecting its annulus;

FIG. 6 is a sectional view taken on the line 6—6 of FIG. 2 showing the duct from one of the tank ports intersecting its associated annulus; and FIG. 7 is a sectional view in two different vertical planes showing details of construction of the valve body.

DESCRIPTION OF THE PREFERRED EMBODIMENT

Figure 1:
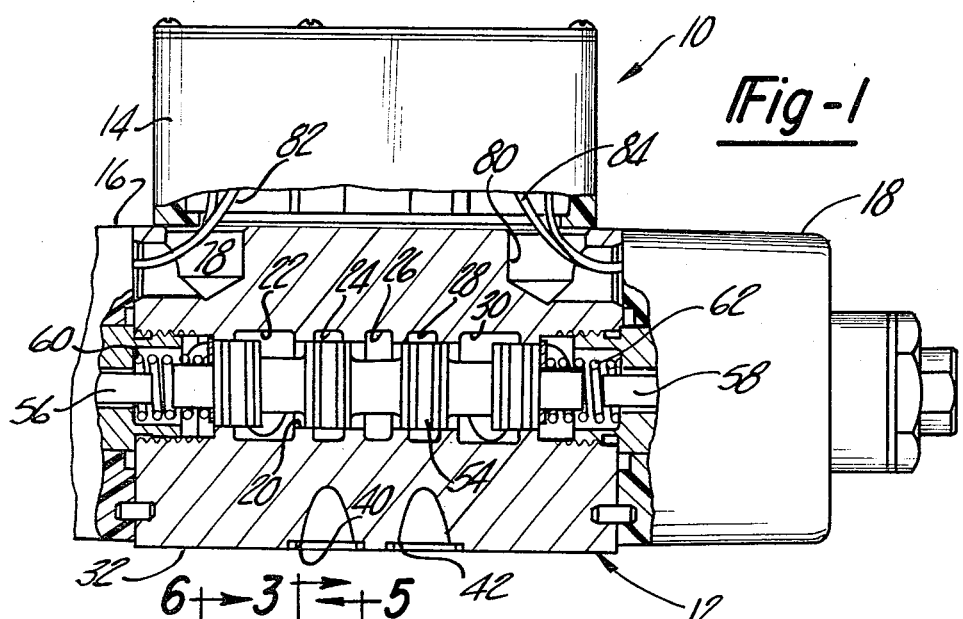
FIG. 1 is a fragmentary front elevational view of a solenoid operated directional valve embodying the present invention, with a portion of the valve shown in axial cross section.
Figure 2:
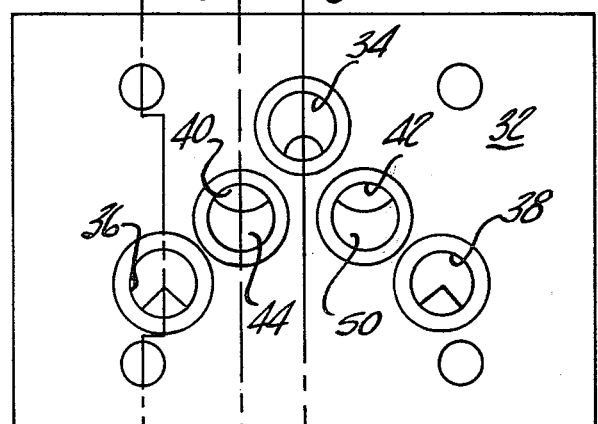
FIG. 2 is a bottom plan view of the valve body thereof, showing the standard arrangement of the ports therein.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. The solenoid directional valve 10 has a valve body 12 on which is mounted a junction box 14 and solenoids 16 and 18.

Figure 3:
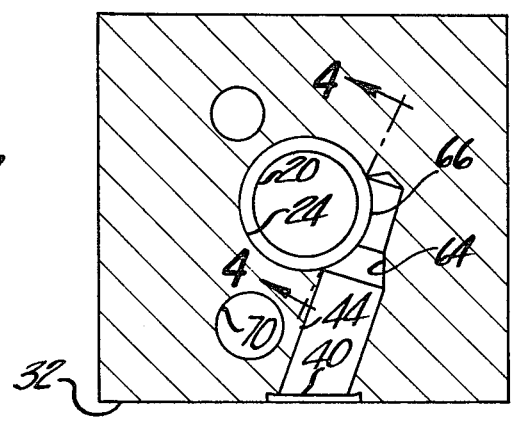
FIG. 3 is a sectional view taken on the line 3—3 of FIG. 2 showing the duct from one of the line ports intersecting its associated annulus.

The valve body 12 has a bore 20 that has a plurality of axially spaced annuli 22, 24, 26, 28 and 30. The valve body 12 is also provided with a mounting surface 32 with a plurality of ports of uniform diameters arranged therein in a pattern of standard configuration. The pattern of ports is generally triangular in shape and contains a pressure "P-port" 34 at the apex of the triangle, a pair of tank "T-ports" 36 and 38 at the corners of the triangle, a pair of line "A- and B-ports" 40 and 42 in the opposite sides of the triangle. In the conventional manner, in some instances only one tank port may be used. Ducts extend from each of the ports to different ones of the annuli so that flow passageways for flow of hydraulic fluid can extend from each of the ports through portions of the bore 20 to another one of the ports. Thus, as shown in FIG. 3, the port 40 is in communication with the annulus 24 by means of the duct 44; as shown in FIG. 5, the pressure port 34 is in communication with the annulus 26 by means of the duct 46; and as shown in FIG. 6, the port 36 is in communication with the annulus 22 by means of the duct 48. In a similar manner, a duct 50, corresponding to that of duct 44 provides, in association with the line port 42, communication with the annulus 28, and a duct 52 corresponding to the duct 48 provides communication between the tank port 38 and the annulus 30.

Mounted within the valve body 12 is a conventional valve spool 54 which has opposite ends which are adapted to be engaged by the solenoid pins 56 and 58 of the solenoids 16 and 18, respectively. In the conventional manner, energizing one or the other of the solenoids 16 and 18 will cause their associated solenoid pins to move axially so that the spool is shifted to allow hydraulic fluid to enter the valve body through the pressure port 34 and to pass through passageways to the selected line port 40 or 42. At the same time, a return fluid can flow from a work station to the other of the line ports 40 or 42 for return flow through the passageway within the valve body to the associated tank port 36 or 38. Conventional springs 60 and 62 are associated with the spool 54 for returning it to its neutral position when the solenoids are not energized.

The ducts 44 and 50 are constructed essentially the same, and only the duct 44 will be described in detail, with particular reference to FIGS. 3 and 4. The duct 44 is arranged so that its axis is essentially tangential to the outer wall of the annulus 24, and it is formed by a drilling operation employing a two-step drill bit with the smaller first step being essentially the same in diameter as the width of the annulus, and the larger second step of the duct having a diameter substantially equal to the diameter of the line or A-port 40. The larger second step of the duct is merged into the smaller first step of the duct by a frusto-conical surface 64 inclined approximately 20 angular degrees to the axis of the duct. By virtue of this drilling operation, a port 66 is introduced in the wall of the annulus 24 and has a configuration essentially that shown in FIG. 4. The port 66 has a cross-sectional area essentially the same as the cross-sectional area of the duct 44. Thus, fluid passing from the port 40 to the bore 20 or returning from the bore 20 to the port 40 will flow through a passageway having essentially a constant effective cross-sectional area and the flow will be tangentially directed between the duct 44 and the bore 20.

Referring now to FIG. 5, the arrangement for providing communication between the port 34 and the bore 20 will be described. As there shown, the duct 46 is drilled into the valve body perpendicularly to the surface 32 to a location adjacent to the outer periphery of the annulus 26. To complete communication between the duct 46 and the bore 20, a secondary duct 68 is introduced into the valve body 12 so as to intersect the outer periphery of the annulus 26 and the duct 46 thereby forming an elongated opening in the annulus 26 no greater than its width and of an area equal to the cross-sectional area of the duct 46 so that, again, a continuous passageway is provided between the duct 46 and the bore 20 that has a constant effective cross-sectional area and which provides for tangential flow between the duct 46 and bore 20.

Ducts 48 and 52 are constructed essentially the same, and only duct 48 will be described. Reference is made particularly to FIG. 6 for a description of this duct. As there shown, the duct 46 is drilled into the valve body 12 perpendicularly to the mounting surface 32 and in an alignment so that the axis of the duct 48 intersects the annulus 22. This provides a port between the annulus 22 and the duct 48 that is essentially the same cross-sectional area as the effective cross-sectional area that is essentially constant. Also, tangential flow occurs when flow in either direction occurs between the duct 48 and the bore 20.

Other conventional passageways can be introduced into the valve body 12, if desired. For example, as shown in FIG. 7, if it is desired to interconnect the two tank ports 36 and 38, this can be accomplished by drilling a duct 70 between them. An auxiliary duct 72 can also be drilled into the valve body to provide communication between the end chambers into which the ends of the spool 54 penetrates via the ports 74 and 76. Also, conventional ducts 78 and 80 can be introduced into the valve body for passage of the electric conductors 82 and 84 that extend between the junction box 14 and the solenoids 16 and 18.

The pattern of ports disclosed above is generally triangular in shape, but other arrangements can be adopted without departing from the scope of the present invention. In other arrangements, for example, the "P-port" and the "A" and "B" ports can define a triangular pattern and one or more tank ports can be located adjacent thereto. Thus, if desired a diamond arrangement can be employed wherein only one tank port is used which is located opposite in the pattern from the "P-port". Likewise, an offset pattern can be used wherein the tank port is displaced away from a triangular arrangement of the "P-port" and the "B" ports, essentially on the same level as the "P-port". Other similar arrangements can also be used.

It is claimed:

1. A solenoid operated directional valve comprising a valve body provided with a bore that has axially spaced annuli, a mounting surface with ports of uniform diameters arranged therein in a pattern of a standard configuration, and ducts extending from each of said ports to different ones of said annuli so that flow passageways for flow of hydraulic fluid can extend from each one of said ports through portions of said bore to another one of said ports, a spool mounted for movement axially in said bore to selected positions for controlling the flow of hydraulic fluid through said passageways, and solenoids mounted on said body at opposite ends thereof and operatively associated with said spool for shifting the latter to said selected positions, characterized in that the effective cross-sectional areas throughout the length of each passageway are essentially the same when the spool is in a selected position to maintain that passageway open, and wherein said pattern of ports is generally triangular in shape and contains a pressure P-port at the apex of the triangle, at least one tank T-port at at least one of the base corners of the triangle, and a pair of line A- and B-ports in the opposite sides of the triangle, each port being in communication respectively with an associated one of said annuli, and the annuli associated with the P-port and the A- and B-ports have widths substantially less than the diameters of their associated ports, and characterized in that the ducts leading from said A- and B-ports are arranged so that their axes are essentially tangential to their associated annuli and the opening from each duct into its annulus has an effective cross section substantially the same as the effective cross section of the duct, and in that the ducts leading from said A- and B-ports are drilled ducts each formed by a two-step drill bit, the smaller first step of each such drilled duct having a diameter substantially equal to the width of the associated annulus, the larger second step of each such drilled duct having a diameter substantially equal to the diameter of the associated port, and the hole defined by the intersection of the first and second step portions of each duct with the associated annulus having a configuration so that the effective area of the hole is essentially the same as the effective area of the associated port.

2. The directional valve that is defined in claim 1, characterized in that the duct leading from said P-port is arranged so that fluid supplied through that duct will enter its associated annulus tangentially and the opening in the annulus in communication with that duct has an effective cross section essentially the same as the effective cross section of that duct.

3. The directional valve that is defined in claim 2, wherein lands on which the spool travels are located between and on opposite sides of said annuli, and characterized in that each said hole extends only into the corresponding one of said annuli and does not penetrate adjacent ones of said lands.

4. The directional valve that is defined in claim 1, characterized in that the larger second step of each drilled duct is merged into the smaller first step thereof by a frustroconical surface inclined approximately 20 angular degrees to the axis of the duct.

5. A solenoid operated directional valve comprising a valve body provided with a bore that has axially spaced annuli, a mounting surface with ports of uniform diameters arranged therein in a pattern of a standard configuration, and ducts extending from each of said ports to different ones of said annuli so that flow passageways for flow of hydraulic fluid can extend from each one of said ports through portions of said bore to another one of said ports, a spool mounted for movement axially in said bore to selected positions for controlling the flow of hydraulic fluid through said passageways, and at least one solenoid mounted on said body and operatively associated with said spool for effecting shifting of the latter to said selected positions, characterized in that the effective cross-sectional areas throughout the length of each passageway are essentially the same when the spool is in a selected position to maintain that passageway open, and wherein said pattern of ports is generally triangular in shape and contains a pressure P-port at the apex of the triangle, at least one tank T-port at at least one of the base corners of the triangle, and a pair of line A- and B-ports in the opposite sides of the triangle, each port being in communication respectively with an associated one of said annuli, and the annuli associated with the P-port and the A- and B-ports have widths substantially less than the diameters of their associated ports, and characterized in that the ducts leading from said A- and B-ports are arranged so that their axes are essentially tangential to their associated annuli and the opening from each duct into its annulus has an effective cross section substantially the same as the effective cross section of the duct, and in that the ducts leading from said A- and B-ports are drilled ducts each having two steps, the smaller first step of each such drilled duct having a diameter substantially equal to the width of the associated annulus, the larger second step of each such drilled duct having a diameter substantially equal to the diameter of the associated port, and the hole defined by the intersection of the first and second step portions of each duct with the associated annulus having a configuration so that the effective area of the hole is essentially the same as the effective area of the associated port.

* * * * *